Oct. 27, 1931.  G. C. BEIDLER  1,828,798
FILM TREATING APPARATUS
Filed July 12, 1930  4 Sheets-Sheet 2
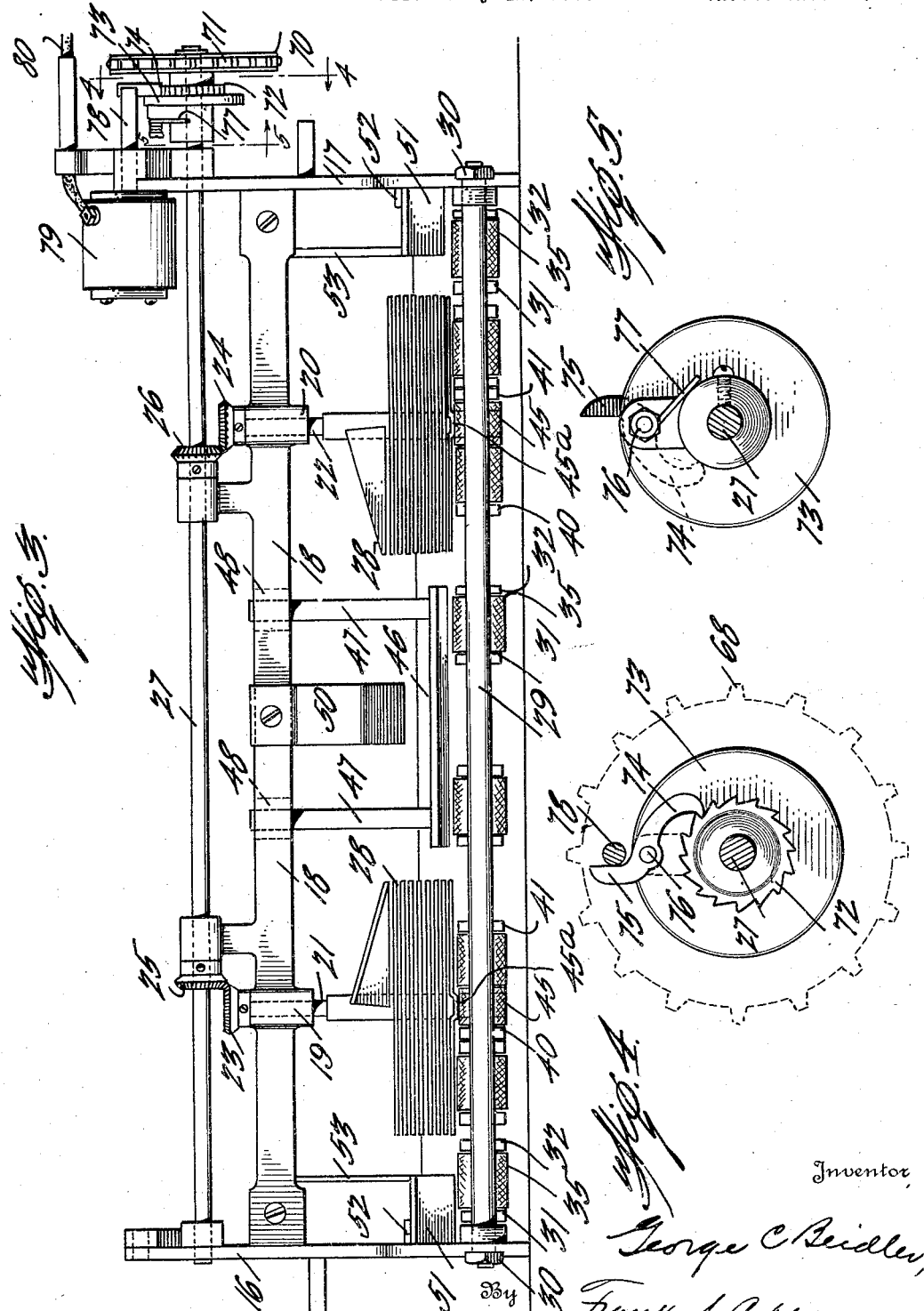
Inventor
George C Beidler,
By Frank S. Appleman
Attorney

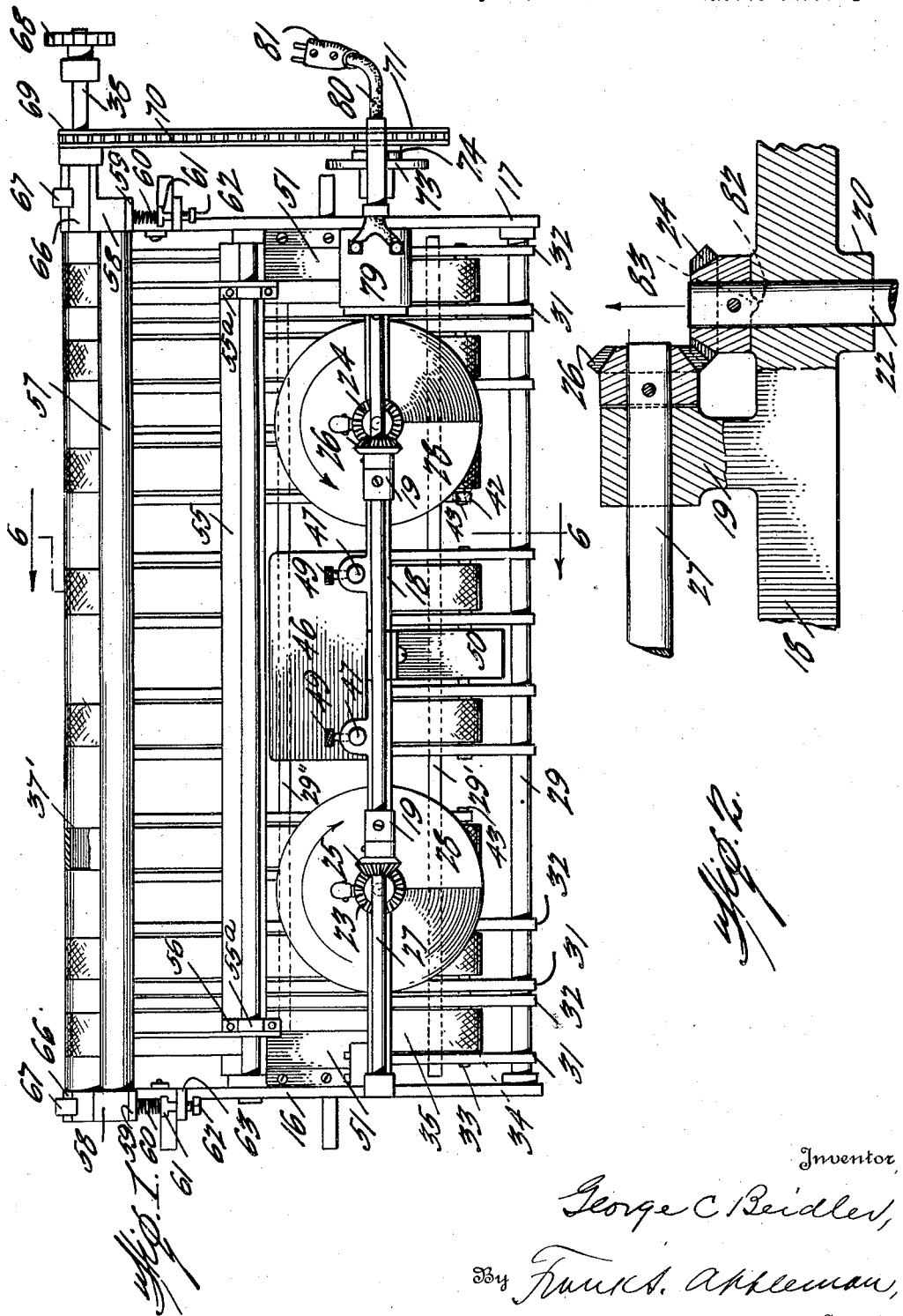

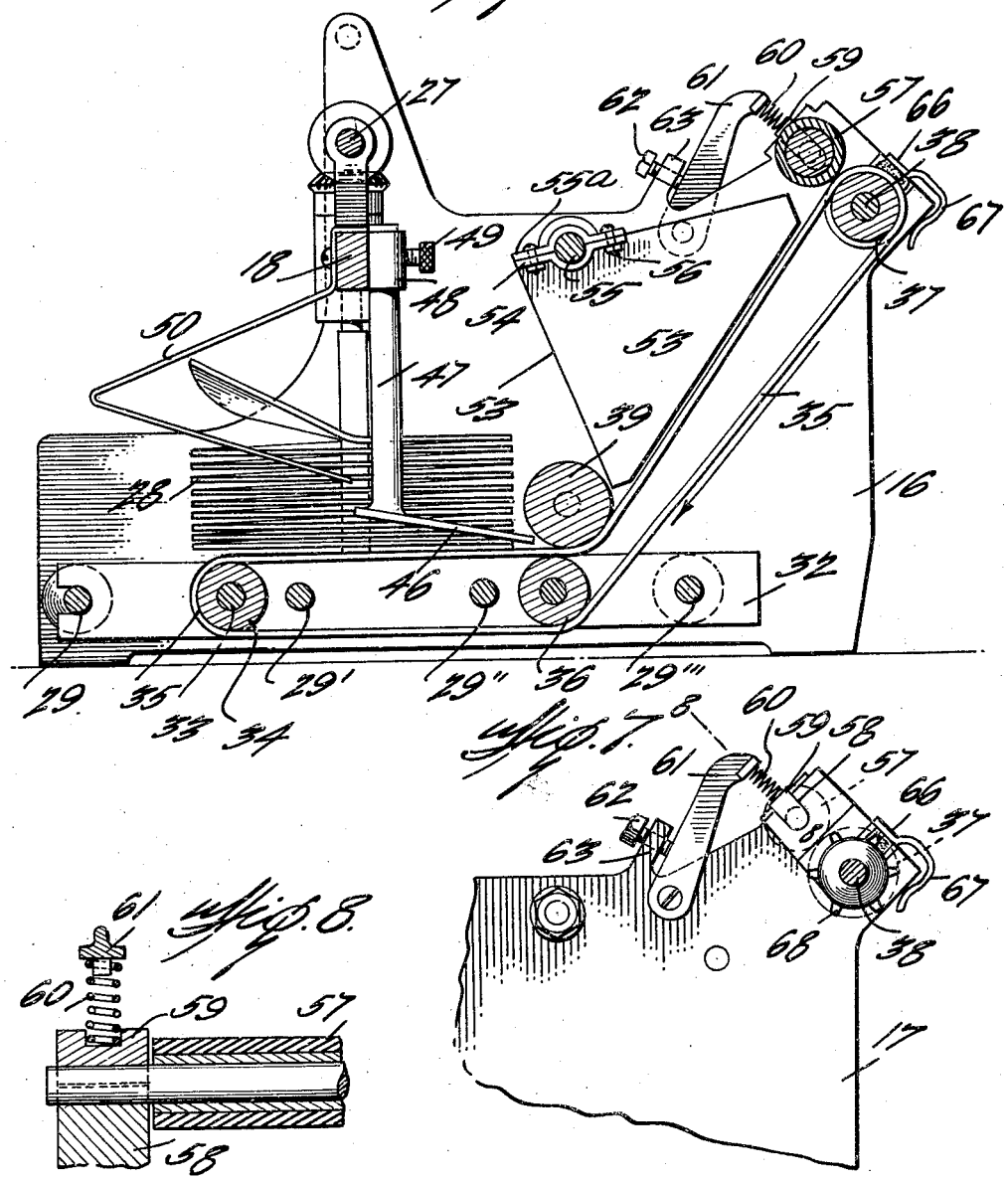

Oct. 27, 1931.  G. C. BEIDLER  1,828,798
FILM TREATING APPARATUS
Filed July 12, 1930  4 Sheets-Sheet 4
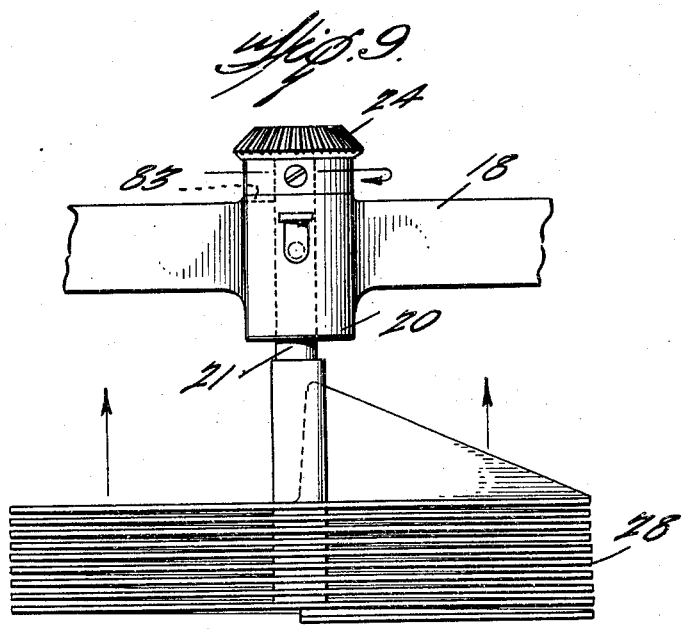
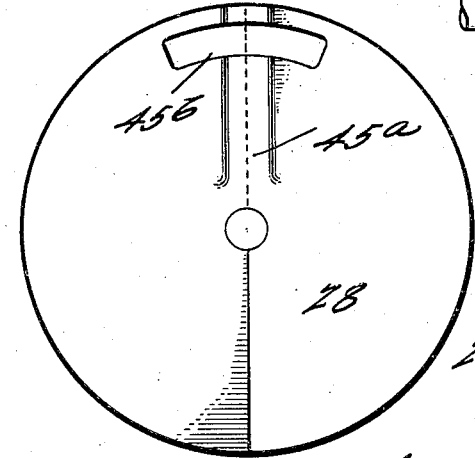
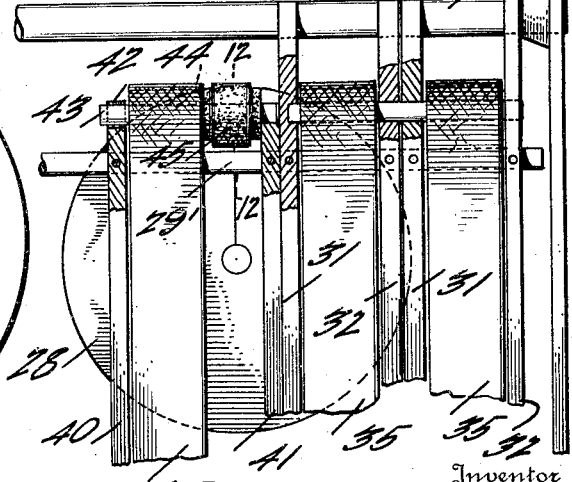
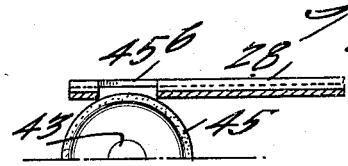

Patented Oct. 27, 1931

1,828,798

UNITED STATES PATENT OFFICE

GEORGE C. BEIDLER, OF ROCHESTER, NEW YORK

FILM TREATING APPARATUS

Application filed July 12, 1930. Serial No. 467,599.

This invention relates to photography, and particularly to means for treating film that has been photographically exposed and is in the process of development, fixing, washing, or which is being otherwise treated to produce a finished picture.

It is an object of the invention to provide means for submerging film in fluid in the course of its treatment while the said film is approximately horizontally disposed in the fluid and also when the films are superimposed, the present invention embodying improvements of an apparatus disclosed in applicant's Patent No. 1,768,022 issued June 24, 1930.

The present invention has for an object to provide novel means for transferring film from the submerging instrumentalities and the fluid in which the film is submerged and ejecting it from the receptacle in which the submerging instrumentalities are located.

The invention furthermore includes guiding means for insuring the delivery of film edgewise to means for removing the film from the receptacle in which the submerging device is located and furthermore to provide other guiding means operative to prevent lateral movement of the film as it is being carried, as heretofore indicated.

It is a further object of this invention to provide novel means for regulating tension or pressure on the film by coacting rollers which operate to move the film and at the same time exert pressure upon the film to remove fluid, in order to prevent the film from carrying an excess amount of fluid from the receptacle in which the film was treated.

The invention further includes an improvement at the bottom of the coils where they coact with the means for moving the film to eject it from a receptacle, the invention furthermore including a novel assembly of rollers and conveying bands and their relation to the base frame members of the apparatus.

The invention furthermore includes novel means for electrically controlling the driving means by which power is transmitted from a source of power to the submerging coils and to the conveyer or instrumentalities for ejecting the film from the receptacle in which the submerger is located.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of a device embodying the invention;

Figure 2 illustrates an enlarged sectional view through the gearing and parts of the mounting by which the submerging coils are driven;

Figure 3 illustrates a view in front elevation of the apparatus;

Figure 4 illustrates a sectional view on the line 4—4 of Fig. 3;

Figure 5 illustrates a sectional view on the line 5—5 of Fig. 3 omitting the structure beyond the ratchet;

Figure 6 illustrates a sectional view on the line 6—6 of Fig. 1;

Figure 7 illustrates a view in elevation of a fragment of certain rollers and driving means;

Figure 8 illustrates a sectional view on the line 8—8 of Fig. 7;

Figure 9 illustrates an enlarged detail view of one of the submergers and its mounting;

Figure 10 illustrates an underneath plan view of the submerger;

Figure 11 illustrates a bottom plan view of conveyer bands and mountings;

Figure 12 illustrates a sectional view on the line 12—12 of Fig. 11; and

Figure 13 illustrates a detail sectional view of a bearing and lubricator.

The descriptive matter of the aforesaid patent which discloses the subjects matter common to the aforesaid patent and the present invention is used as a part of the specification of this invention.

As previously stated, the submerging device is preferably employed in association with a receptacle having fluid and while reference may be made to fluid and to a receptacle, neither of which is shown, those skilled in the art will visualize these elements without their being depicted. The apparatus embodies frame plates 16 and 17, associated with a connecting bar 18 anchored in appropriate manner to the respective frame plates. Journal bearings 19 and 20 are formed as a part of the bar and the shafts 21 and 22 are journaled in the respective bearings. The shafts 21 and 22 are respectively provided with gear wheels 23 and 24 engaged by gear wheels 25 and 26, respectively, on a shaft 27. The gear wheels 25 and 26 are set on opposite sides of the gear wheels 23 and 24 and rotate the shafts 21 and 22 in a clockwise and anti-clockwise direction, respectively. A helical or screw conveying device 28 is located on the lower end of each shaft and in such relation to the frame plates that when the frame is placed in a receptacle, the conveying device will be in spaced relation to the bottom of a receptacle in which the said apparatus is located. Rods 29, 29''' have their ends anchored in the frame plates, the said rods extending through the frame plates and having nuts 30 threaded on them for binding the parts together, it being shown that the rods 29' and 29'' are also associated with the construction.

A plurality of plates that are relatively narrow are mounted on the rods 29, 29', 29'', 29''', respectively, and they act as journal bearings for trunnions of rollers over which conveyer bands operate. As shown in the drawing, some of these plates are arranged in pairs and numbered 31 and 32 and the journals, such as 33, of rollers, such as 34 are rotatively mounted in said plates near the front ends thereof and the said rollers are each engaged by a conveyer belt or band 35 which operates over another roller 36 mounted in like manner in bearings of the plates and over a roller 37 on a shaft 38, the said roller 37 having annular recesses, such as 37' forming seats in which the conveyer bands or belts run, the depth of each seat being approximately equal to the thickness of the conveyer band in order that the external surface of the conveyer band and the periphery of the roller will be on the same plane. An idling roller 39 is rotatively mounted between the frame plates, and its axis is slightly offset with relation to the axes of the rollers 36, and the relation of parts is such that the conveyer bands travel partially around the roller 39 after the conveyer bands have passed the axes of the rollers 36.

Pairs of plates 40 and 41 are located under the spiral submerger and they are of less length than the other plates. They have recesses 42 in their ends in which the trunnions or shafts 43 of a roller 44 are journaled. The roller 44 coacts with a conveyer band in the same manner that the conveyer bands coact with the rollers 34, but in addition to the roller for the conveyer band, a wheel 45 is mounted on each of the shafts 43 immediately under the spiral submerger near its periphery. One part of each spiral submerger is radially dished to form a depending rib 45$^a$ and that part of each submerger at the rib is cut away or slotted, at at 45$^b$, to provide a clearance for the periphery of the wheel 45. As seen in the drawing, the slot is curved in order that said clearance will be effective as the submerger is initially turned under the influence of the driving mechanism. The diameter of the wheel 45 is slightly greater than the diameter of the adjacent roller and conveyer band, and the wheel has a relatively soft tread surface which is designed to engage film released by the conveyer and impart initial movement to said film to carry it into the zone of operation of the conveyer bands in order that the film will be carried by the conveyer bands and ejected. The open bearings for the shafts 43 permit the shafts to be removed expeditiously in order that the wheel of each shaft may be replaced when its surface becomes deteriorated and its function impaired by reason of oxidation of the rubber coating or from other cause.

In order to insure the delivery of the film between the roller 39 and the conveyer bands, an inclined guiding plate 46 carried by posts 47 is adjustably held suspended above the conveyer bands, and the position of the plate with relation to the conveyer bands may be regulated by reason of the fact that the posts are slidable vertically in sleeves 48 on the bar 18 and the said posts are held in place by clamping screws 49 which may be threaded in the sleeves. An inclined guide 50 is also mounted on the bar 18 between the spiral submergers, and this guide is operative to insure the delivery of film to the spiral submergers at the tops thereof, it being shown that the spiral submergers are flared at their upper ends to provide spaces for the admission of film moving into operative relation with them.

Other inclined guides 51 are supported by flanges 52 formed integral with the frame plates. The guiding plate 46 is located between the spiral submergers, and the guides 51 are at the ends so that the film is guided at its ends and central zone.

Each of the vertically disposed guiding plates 53 has a clip member, such as 54, secured to it to fit under a rod 55 similar to the rod 29. The rod 55 is secured in place in a manner similar to that of the rod 29, and each clip member 54 is designed to coact with a clip member 55$^a$, the said clip members being assembled on the rod 55 by fastenings 56, such as bolts. By reason of the employment of clips, the guiding plates 53 may be adjusted longitudinally of the rod to accommodate themselves to film of different widths. The plates act to prevent lateral movement of the film as it is being ejected from the apparatus while moving up an incline and over the roller 37.

A roller 57 which is preferably rubber-jacketed coacts with the roller 37 and the conveyers operating thereover. The rubber jacket provides a yielding surface and aids in squeezing fluid from the film as it is being ejected. The trunnions of the jacketed roller rotate in slotted bearings, such as 58, the said trunnions being inserted in the slots of the bearings and being held therein at each end by a follower block 59 held under tension by a spring 60. The outer end of the spring is engaged by a pivotally mounted arm 61 and the tension of the spring is regulated by a screw 62 threaded in a lug 63 integral with the frame, which screw bears against the edge of the arm opposite that engaging the spring.

Each of the frame plates has a slotted journal bearing 64 in which the shaft 38 is rotative and after the shaft has been applied to the slotted bearing, a lubricating pad 65 carried by a clip 66 is inserted in the slot in contact with the shaft. The clip has a resilient arm 67 attached to it and the said arm embraces a part of the bearing so that the clip is frictionally held in place.

The shaft 38 is provided with a sprocket wheel 68 which may be driven from any suitable source of power and it also has a sprocket wheel 69 thereon engaged by a sprocket chain 70 which operates over a sprocket wheel 71 that idles on the shaft 27.

The shaft 27 operating the spiral submergers is intermittently driven from the shaft 38 and the spiral submergers therefore remain at rest at certain intervals while the conveyers are being driven to eject film. In order to operate the spiral submergers from the driven sprocket wheel 71, the said sprocket wheel has a ratchet wheel 72 on the inner face of its hub which rotates with it. The shaft 27 is provided with a disk 73 secured to it and a ratchet 74 is pivoted on the face of the disk in alinement with the ratchet wheel 72, and the ratchet is adapted to engage the ratchet wheel for coupling the sprocket wheel carrying the ratchet wheel to the shaft 27 for rotating it. The ratchet has an extension 75 projecting above the periphery of the disk. The ratchet is mounted on a pivot 76 extending through the disk and the said pivot on the side of the disk opposite the ratchet is encircled by a spring 77, one end of which is anchored to the disk in known manner and the other end of which bears against the hub of the disk. The relation of parts is such that the spring exerts force on the ratchet to move it into engagement with the ratchet teeth, in which relation power is communicated through the aforesaid instrumentalities to the shaft 27 and to the spiral submerger. A rod 78 is projectable into the path of travel of the extension of the ratchet and when it is in the path of travel, the extension of the ratchet strikes the rod and disengages the ratchet from the ratchet wheel, permitting the conveyer bands to be operated while the spiral submerger is at rest. The rod is under pressure which normally projects it into the path of travel of the extension of the ratchet, but the said rod may be retracted against the action of said force and, to that end, electromagnetic means is employed.

There is shown an electromagnet or solenoid 79 with which the rod is associated and through suitable wiring 80 and an electric coupling 81, the electromagnetic device may be energized and operated to retract the rod out of engagement with the ratchet or out of its path to travel. A suitable circuit controlling device may be provided to time the electrification of this part of the device so that when the spiral submergers are to be operated, the rod will be retracted in order that they may be driven as heretofore described.

The bar 18 has a notch or seat 82 for a cam 83 of each gear wheel 24. When the cams are seated in the recesses, the bottom of each spiral submerger is close to one of the wheels 45, but as the spiral submergers start to rotate, the cams rise out of their seats and travel on the upper surface of the bar with the spiral submergers in somewhat elevated positions, as compared with their positions when the cams again register with the seats and the submergers drop a degree indicated by the depth of the seats.

The different elements of the apparatus have been described and their functions have been stated so that a résumé of the operation of the device is believed unnecessary for an understanding of the invention.

In this art, the term "film" is frequently used as a collective noun and frequently the terms "film" and "films" are used as alternative descriptive terms and therefore in order to avoid confusion, the specification should be interpreted with this definition in mind.

I claim:

1. In a film treating apparatus, rotatively mounted vertically disposed spiral submergers operative to move film downwardly and release it, a radial rib at the bottom of each submerger, each of said submergers having an aperture in its lower end extending at the rib, wheels one of which is rotatively mounted in operative relation to a rib and aperture of one of said submergers for imparting movement to the film released by the submerger, and means for rotating the wheels.

2. In a film treating apparatus, rotatively mounted vertically disposed spiral submergers operative to move film downwardly and release it, a radial rib at the bottom of each submerger, each of said submergers having a curved slot in its lower end extending through the rib, means for moving the submergers vertically while rotating, wheels one of which is rotatively mounted in operative relation to a rib and slot of one of said submergers for imparting movement to a film relased by the submerger, and means for rotating the wheels.

3. In a film treating apparatus, rotatively mounted vertically disposed spiral submegers operative to move film downwardly and release it, a radial rib at the bottom of each submerger, each of said submergers having a curved slot in its lower end extending through the rib, means for moving the submergers vertically, wheels one of which is rotatively mounted in operative relation to a rib and slot of one of said submergers for imparting movement to the film released by the submerger, means for rotating the wheels, flexible conveying elements, and means for mounting and moving the said elements approximately horizontally under the spiral submergers and upwardly beyond said submergers and ejecting them.

4. In a film treating apparatus, rotatively mounted vertically disposed spiral submergers operative to move film downwardly and release it, a radial rib at the bottom of each submerger, each of said submergers having a curved slot in its lower end extending through the rib, means for moving the submergers vertically, wheels one of which is rotatively mounted in operative relation to a rib and slot of one of said submergers for imparting movement to a film released by the submerger, means for rotating the wheels, flexible conveying elements, means for mounting and moving the said elements approximately horizontally under the spiral submergers and upwardly beyond said submergers, and rollers between which the film is delivered by the conveying elements, the said rollers being operative to remove excess fluid from the film.

5. In a film treating apparatus, rotatively mounted vertically disposed spiral submergers operative to move film downwardly and release it, means for moving the said film thereafter, means for driving the submergers and the said moving means, and electromagnetically actuating means for controlling the drive whereby power transmitted for operating the submergers is interrupted while power for driving the means for removing the film is continued.

6. In a film treating apparatus, means for moving horizontally disposed films downwardly and releasing them, means for removing the released films, means for operating the means for removing the films, a shaft having gearing for rotating the means for moving the films downwardly, a member fixed on the said shaft, a member rotatively mounted on the said shaft, means for driving the said rotative member from the means for driving the means for removing the films, means for coupling the rotative member to the member fixed on the shaft, and an electromagnetically controlled device for disengaging the means for coupling the rotative member to the member fixed on the said shaft.

7. In a film treating apparatus, rotatively mounted submergers for moving horizontally disposed film downwardly and releasing it, means for removing the released film, means for rotating the submergers and moving the aforesaid means, and electrically actuated means for interrupting the operation of the means for rotating the submergers while continuing the operation of the means for removing the film.

8. In a film treating apparatus, rotatively mounted spiral submergers operative to move horizontally disposed film downwardly and release it, conveyers for removing the released film, a rotative shaft operative to rotate the spiral submergers, a member rotatively mounted on the shaft, means for communicating power from the means for driving the conveyers to the said rotative member, a member fixed on the shaft, means for coupling the rotative member to the member fixed on the shaft, and electrically controlled means for disengaging the means for coupling the rotative member to the member fixed on the shaft.

9. In a film treating apparatus, rotatively mounted spiral submergers operative to move horizontally disposed film downwardly and release it, conveyers for removing the released film, a rotative shaft operative to rotate the spiral submergers, a member rotatively mounted on the shaft, means for communicating power for the means for driving the conveyers to the said rotative member, a member fixed on the shaft, means for coupling the rotative member to the member fixed on the shaft, a ratchet wheel carried by the rotative member, a ratchet on the member fixed to the shaft adapted to engage the ratchet wheel for transmitting the motion of the rotative member to the said shaft, and electrically controlled means for disengaging the ratchet from the ratchet wheel.

10. In a film treating apparatus, rotatively mounted vertically disposed spiral submergers operative to move film downwardly and release it, a radial rib at the bottom of each submerger, each of said submergers having a curved slot in its lower end extending through the rib, means for moving the submergers vertically, wheels one of which is rotatively mounted in operative relation to a rib and slot of one of said submergers for imparting movement to a film released by the submerger, means for rotating the wheels, conveying elements, means for mounting and moving the said elements approximately horizontally under the spiral submergers and upwardly beyond said submergers, a rotative guide around which the conveying elements travel when changing from the approximately horizontal movement to the inclined run, fixed guides for directing film into the zone of action of said rotative guide, and rollers between which the film is delivered by the conveying elements, the said rollers being operative to remove excess fluid from the film.

11. In a film treating apparatus, rotatively mounted vertically disposed spiral submergers operative to move film downwardly and release it, a radial rib at the bottom of each submerger, each of said submergers having a curved slot in its lower end extending through the rib, means for moving the submergers vertically, wheels one of which is rotatively mounted in operative relation to a rib and slot of each submerger for imparting movement to a film released by the submerger, means for rotating the wheels, conveying elements, means for mounting and moving the said elements approximately horizontally under the spiral submergers and upwardly beyond said submergers, a rotative guide around which the conveying elements travel when changing from the approximately horizontal movement to the inclined run, fixed guides for directing film into the zone of action of said rotative guide, vertical guides at the sides of the inclined run of the conveying elements, and rollers between which the film is delivered by the conveying elements, the said rollers being operative to remove excess fluid from the film.

GEORGE C. BEIDLER.